United States Patent [19]

Doughty

[11] 3,912,696

[45] Oct. 14, 1975

[54] CURABLE PLASTIC COMPOSITION

[75] Inventor: John I. Doughty, White Bear Lake, Minn.

[73] Assignee: Minnesota Mining and Manufacturing Company, St. Paul, Minn.

[22] Filed: July 23, 1962

[21] Appl. No.: 211,886

[52] U.S. Cl. .............................................. 260/79.1
[51] Int. Cl.$^2$.. C08G 75/14; C08K 3/22; C08K 3/24
[58] Field of Search...................... 260/608, 79.1, 79

[56] References Cited
UNITED STATES PATENTS

| | | |
|---|---|---|
| 2,206,643 | 7/1940 | Patrick............................. 260/79.1 |
| 2,216,044 | 9/1940 | Patrick............................. 260/79.1 |
| 3,225,017 | 12/1965 | Seegman........................... 260/79.1 |
| 3,349,047 | 10/1967 | Sheard............................. 260/79.1 |
| 3,455,854 | 7/1969 | Deltieure.......................... 260/79.1 |
| 3,586,660 | 6/1971 | Sakata.............................. 260/79.1 |
| 3,645,956 | 2/1972 | Doughty........................... 260/79.1 |
| 3,654,241 | 4/1972 | Doughty........................... 260/79.1 |
| 3,714,132 | 1/1973 | Nakanishi.......................... 260/79.1 |
| 3,849,386 | 11/1974 | Bernstein.......................... 260/79.1 |
| 3,852,214 | 12/1974 | Gallagher.......................... 260/79.1 |

OTHER PUBLICATIONS

Jorczak, "Polysulfide Liquid Polymers," Vol. 43, No. 2., I & EC, 1951, (pp. 324–328).

*Primary Examiner*—Donald E. Czaja
*Assistant Examiner*—C. Warren Ivy
*Attorney, Agent, or Firm*—Alexander, Sell, Steldt & DeLaHunt

EXEMPLARY CLAIM

10. A stable unitary liquid polymer composition protected from moisture and capable of being shipped and stored in a single container and later being deposited in place without agitation or intermixing with other material for complete curing by contact of its surface with surroundings containing essentially only moisture, said composition comprising essentially (a) a liquid polyalkylene polysulfide polymer having thoroughly dispersed therein, (b) a dormant curing agent in an amount sufficient to cure said polymer which is activated by the presence of moisture, and (c) an alkaline desiccating deliquescent accelerating agent adapted and sufficient to maintain said polymer in dry condition during shipment and storage and to attract and absorb moisture from its surroundings after deposition in place to hasten the curing of said polymer by said curing agent, wherein (b) and (c) are different substances and said accelerating agent is water-soluble and composed of at least one number of the group consisting of the alkaline earth metal oxides and hydroxides.

14 Claims, No Drawings

CURABLE PLASTIC COMPOSITION

This invention relates to plastic or liquid compositions in the nature of sealers and coatings, and in particular to one-part compositions which are essentially unchanged in viscosity on prolonged storage while being capable of curing to a rubbery stage on mere exposure to the atmosphere.

The invention provides sealing and coating compositions which are immediately applicable as supplied and without any necessity for preliminary mixing, addition of catalytic or curing agents, or other manipulations. The application of the plastic or liquid material in thin section to various surfaces, and exposure of the material to the atmosphere, results in rapid surface cure followed by steadily progressing internal cure to an adherent rubbery or elastomeric stage. The product is therefore useful in sealing small crevices between edges or narrow surfaces of glass, wood, metal, concrete or other materials, as well as in providing protective coatings on many surfaces.

One particular preferred embodiment is in the form of a viscous fluid or paste-like mass capable of extrusion in a narrow ribbon from a collapsible tube or a calking gun. The material adheres strongly to stone, masonry, metal, glass and other surfaces. It possesses sufficient body to remain in position, when applied to vertical surfaces, without flowing or sagging. It remains readily extrudable when stored in the tube or container at normal room temperature for many months, but when extruded and exposed to the atmosphere at about 35% relative humidity or higher, soon becomes tack-free at the surface and then gradually cures to a uniformly elastomeric rubbery condition. In the cured condition it remains firmly bonded to the masonry or other surface and is not split or fractured even under severe strains occasioned by expansion and contraction of the supporting structure under wide variations in temperature. All of these properties are conveniently attained in compositions based on liquid polymercaptan polymers, and particularly on Thiokol "LP" liquid polymercaptan polysulfide polymers. These commercially available materials have an average molecular weight of about 300 to about 8,000 and may be prepared by controlled splitting or cleavage of polysulfide condensation polymers of sodium polysulfide and organic polyhalides.

The preparation of liquid polythiopolymercaptan or polysulfide polymers has been described in detail in Patrick et al U.S. Pat. No. 2,466,963. Typical liquid polymers are prepared, for example, by first reacting together sodium polysulfide, dichlorodiethyl formal and a small proportion of trichloropropane in aqueous emulsion, and then splitting the resulting polymer, by reaction with sodium hydrosulfide and sodium sulfite, to the desired average molecular weight.

The Patrick et al patent also describes the curing of the liquid polymercaptan polysulfide polymers to the rubbery solid state by reaction with various oxidizing agents. Many of the systems described require heating, e.g. at up to 300°F. or higher, to cause the reaction to proceed. With lead peroxide the reaction occurs at room temperature directly on mixing the powdered oxidizer into the liquid polymer. With zinc peroxide the action is less rapid and with anhydrous polymer the mixture is said to be stable, curing being then initiated by addition of water followed by exposure to ammonia fumes or the like. Since the polymer invariably contains traces of water remaining from its preparation in aqueous medium, a fully anhydrous system, and a stable mixture, is difficult to attain.

It has now been found that normally stably fluid adherent compositions capable of atmospheric self-curing at normal room temperatures may be prepared from liquid polymercaptan polymers, and particularly from the liquid polysulfide polymercaptan polymers, by incorporating therewith an oxidizing agent normally incapable of causing atmospheric curing, together with barium hydroxide in the form of an impalpable powder.

Typical oxidizing materials which serve as preferred curing agents include the peroxides of divalent metals such as zinc, calcium, strontium and barium. Sodium, potassium or ammonium dichromate are useful but form residual water-soluble materials which in some instances have resulted in decreased adhesion values. The same is true of potassium chlorate. Less effective although still observable cures are obtained with compositions containing zinc chromate or zinc oxide as the oxidizing agent in these compositions. Lead peroxide, on the contrary, causes rapid curing of the composition even though fully protected from the atmosphere.

The ability of a specific oxidizing material to form an adequately stable mixture with the liquid polymer may be determined by a simple test. To the polymer there is first added one percent by weight of isosebacic acid. The required amount of oxidizer is then added and mixed in well. The viscosity of the mixture is noted. The mixture is then placed in a sealed container and held at 120°F. for several days, when it is again examined. With the preferred oxidizers, the mixture will exhibit no more than a slight thickening after seven days, and in most cases will remain at essentially its initial fluidity for at least three months. Oxidizers which cause but slight thickening in 3 days at 120°F. are useful in many cases although not preferred where prolonged stability is required. On the other hand, compounds such as lead peroxide are found to cause severe thickening within a few minutes after being added to the polymer, and to cause curing to the rubbery state within a few hours.

The rubbery state may be defined as the condition in which the polymer no longer undergoes plastic flow but instead retracts essentially completely when momentarily stretched or compressed.

As previously noted, the polysulfide polymercaptan liquid polymers contain small amounts of residual water. The addition of alkaline materials to the mixture of polymer and curing agent might be expected to cause immediate cure in view of the known effect of ammonia fumes or the like in initiating the cure of such mixtures. With large amounts of barium hydroxide a curing effect is in fact observed. With the smaller amounts here employed, ranging from about two to about 20 or 30 parts by weight of the barium compound for 100 parts of the polymer, the addition is surprisingly found to improve rather than diminish the stability of the composition.

An important requirement is that the barium hydroxide be present as an impalpable powder. To this end the material may be ground in a ball mill or other suitable mechanism under anhydrous conditions but is preferably ground as a slurry with liquid non-reactive plasticizer or other components of the batch. The final product should be sufficiently fine to produce no gritty feeling when rubbed between thumb and finger.

Barium hydroxide Ba(OH)$_2$ added as an impalpable powder by itself or in admixture with other components provides for a high order of stability in the composition during storage together with rapid atmospheric curing under use conditions and is the preferred activator material. It may be effectively replaced by barium oxide, also in the form of an impalpable powder, although with some reduction in initial rate of atmospheric cure. Since barium oxide is strongly reactive with water to yield the hydroxide, and since some traces of water are unavoidably present in these compositions, it seems probable that at least a portion of the barium is initially present as the hydroxide, and that all of it eventually is converted thereto; and hence the oxide is considered to be a full equivalent of the barium hydroxide as recited in the claims.

The presence of barium hydroxide appears to be critical in the effective storage stabilizing and atmospheric curing of most if not all of these compositions. For example, while strontium hydroxide has proven effective in compositions containing zinc peroxide, it has not been found adequate in conjunction with calcium or barium peroxides. Oxides and hydroxides of strontium, calcium and aluminum provide useful atmospheric cures in conjunction with sodium dichromate as the curing agent, but as previously noted the compositions cured with alkali metal salts are found to have somewhat less desirable adhesion properties.

The following Examples will serve further to illustrate but not to limit the invention. Proportions are in parts by weight unless otherwise indicated.

EXAMPLE 1

A quantity of barium hydroxide is ground in a mortar to an impalpable powder, precautions being taken to maintain essentially anhydrous conditions.

Liquid polysulfide polymer ("Thiokol LP-31") having an average molecular weight of about 7,000 is mixed with calcium carbonate powder in the proportions of 100:80 and the mixture is heated at 225°F. until any foaming ceases, for removal of any excessive amounts of free water. There is then added 10 parts of the powdered barium hydroxide, and two parts each of calcium peroxide and zinc peroxide, both in powder form. The components are well mixed, forming a plastic dough or paste which is easily extrudable. The composition is placed in metal containers and hermetically sealed. After 7 days at 120°F. a sample shows no change in viscosity. The same is true after 4 months at normal room temperature.

Portions of the composition are tested as coatings and sealers by spreading in thin films over various substrates and exposing to air at 77°F. and 50% relative humidity. The coatings cure to a tack-free surface within 4 hours and in thicknesses of about one-eighth inch are found to cure to a resilient rubbery state within about 3 to 4 days. The coatings adhere well to the substrates both under dry conditions and when covered with water.

Essentially identical results are obtained by replacing the four parts of mixed calcium and zinc peroxides with ten parts of either of them.

EXAMPLE 2

| | |
|---|---|
| Liquid polysulfide polymer ("Thiokol LP-31") | 2,000 |
| Isosebacic Acid | 20 |
| Surface-coated Calcium Carbonate ("Supermultifex") | 700 |
| Titanium Dioxide | 400 |
| Calcium Carbonate ("Lesamite") | 900 |
| Dixylyl Disulfide ("RR-10") | 20 |
| Neopentyl Glycol Isosebacate | 36 |
| Solidified Vegetable Oil Derivative ("Thixcin") | 50 |

The polysulfide polymer is heated in a jacketed mixer with steam at 30 psi in the jacket and the pigment and filler added slowly. The temperature is held at about 225°F. until any frothing ceases. The remaining materials are added as the batch is cooled in the mixer, which is kept covered and flushed with dry nitrogen meanwhile. The completed mixture is a paste-like mass which is sufficiently thixotropic to permit effective stirring and mixing while avoiding any running or sagging when applied at moderate thickness on a vertical wall.

Separately there is prepared a dispersion of zinc peroxide in an equal amount by weight of "Aroclor 1254" liquid chlorinated diphenyl. The mixture is ground in a paint mill until smooth and uniform. There is also prepared a dispersion of 250 parts of anhydrous barium hydroxide in 250 parts of Aroclor 1254 and 100 parts of toluol, the mixture in this instance being milled cold in a Kady mill until a portion feels smooth and creamy when rubbed between thumb and finger. To 100 parts of the paste-like master batch are then added 10 parts each of the two dispersions, the composition being mixed until uniform under essentially anhydrous conditions.

The batch is tested for stability under storage by sealing a portion in a vial and storing at 120°F. After 3 days the sample exhibits almost no thickening.

Another portion of the batch is tested as an adhesive sealer. A clean glass panel is coated over an area 1 inch wide and 12 inches long with a uniform layer of the sealer at a thickness of one-eighth inch. Separately a 1½ inch × 12 inch strip of heavy cotton duck fabric is coated with a layer of the sealer which is worked into the pores of the cloth, the surplus being then scraped away. The two coatings are combined and the panel permitted to remain exposed to the atmosphere at 75°F. and 50% relative humidity for 3 weeks. Approximately one-half the length of the cloth is then stripped from the glass by pulling a free end back over the adhered portion in a tensile test machine at a speed of 2 inches per minute. A force of about 15 lbs. is required to remove the fabric. Prior to cure of the sealer component the removal force is less than 1 pound. In both cases failure occurs within the layer of sealer rather than by removal from the substrate.

The remaining test strip is soaked in water for four days and the stripping test continued. With untreated glass as the substrate the strip is removed under a force of 3 to 4 pounds through adhesive failure at the glass-sealer interface. With glass which has previously been prime-coated by swabbing with an aqueous 5% solution of aminopropyl triethoxy silane and then dried, the removal force is increased to 14–15 lbs. and failure occurs within the layer of sealer rather than at the primed glass surface.

These tests indicate superior quality as an adherent sealer. In practical tests the composition is employed in filling cracks up to one-half inch width in masonry and stone walls, in sealing around metal window-frames in concrete, stone or brick facings, and in sealing glass panes in wooden and metal frames. In all cases the composition forms an effective adherent waterproof resilient seal.

During application the exposed surface of the ribbon of sealer composition is conveniently smoothed and leveled by lightly stroking with the wetted finger. The water prevents adherence of the sealer to the finger and initiates surface cure of the sealer.

The experiment is repeated using barium oxide in place of the barium hydroxide. The barium oxide is first reduced to a fine powder by grinding in a mortar as in Example 1 and is then mixed with the Aroclor resin and toluol in the Kady mill. After four weeks of atmospheric curing the removal effort is somewhat lower than that required for the batch containing the barium hydroxide but the value increases with continued cure time to substantially the same endpoint.

EXAMPLE 3

A sealer composition is prepared and tested in accordance with Example 2 except that calcium peroxide is substituted for the zinc peroxide. The mixture is stable under storage for at least 3 days at 120°F. and for many months at room temperature. In the stripback test the removal effort for the dry sample after 4 weeks of atmospheric aging is 13 pounds with the barium hydroxide formulation and 8 pounds with the barium oxide mixture.

EXAMPLE 4

The sealer composition of Example 2 employing barium hydroxide is compared with compositions prepared identically except for the substitution for the "Thiokol LP-31" polysulfide polymer of "LP-2," "LP-32," and a 1:1 mixture of "LP-2" and "LP-31." The compositions are spread in 1/8 inch thickness and subjected to atmospheric curing. The rubbery cured products are then tested for elongation at break, with results as follows:

| Polysulfide Polymer | $E_b$, Percent |
|---|---|
| LP-2 | 300 |
| LP-31 | 400–500 |
| LP-32 | 300 |
| Mixture of LP-2 and LP-31, 1:1 | 500–550 |

EXAMPLE 5

| Olefinic polyester | 346 |
|---|---|
| Mercapto polyester | 154 |
| "Supermultifex" bodying filler | 175 |
| TiO$_2$ pigment | 100 |
| "Lesamite" filler | 225 |
| Zinc peroxide in Aroclor resin | 100 |
| Barium hydroxide in Aroclor-toluol | 120 |
| "Thixcin" solidified oil | 12.5 |

The "Supermultifex" powder provides a false bodying effect as in the composition of Example 2 and permits stirring and extruding while preventing running or sagging of the material on application to vertical wall surfaces. The pigment provides desirable color; where desired, pigments of other colors or shades may be used. The "Lesamite" acts as a further filler material and provides increased bulk. The zinc peroxide and barium hydroxide are added as dispersions prepared as described in Example 2.

The olefinic polyester is an unsaturated neutral ester of maleic acid, isobutyl alcohol, and a hydroxyether of glycerol and dihydroxypropane, having the probable formula $$C_3H_5(OC_3H_6OCOCH=CHCOOC_4H_9)_3$$

and is a soft plastic resinous or balsamic material.

The mercapto polyester is prepared by esterifying the hydroxyl group of a mercapto-alcohol, such as beta-mercaptoethanol, with the carboxyl groups of a polycarboxylic acid, such as a polymerized fatty acid or an acidic polyester of a dicarboxylic acid and a glycol. These polyesters contain only two mercaptan groups. Polyester polymercaptans having an average of slightly more than two mercaptan groups may be similarly prepared by incorporating small proportions of tribasic acids or trihydroxy alcohols, and such materials in conjunction with oxidative curing agents and powdered barium oxide or hydroxide likewise provide stable compositions which undergo atmospheric curing to the rubbery state and are useful as sealers and coatings as herein described. Mixtures of the polyester polymercaptans with the polysulfide polymercaptans of the previous Examples are also useful in these compositions.

The resinous components are mixed together under a blanket of nitrogen in a heavy duty mixer, and the remaining components added and mixed in as previously described. The composition is stable at 120°F. for at least 3 days and at room temperature for at least 4 months when stored in hermetically sealed containers. In eighth-inch thickness and exposed to the atmosphere at 75°F. and 50% relative humidity it rapidly becomes tackfree, and cures to a rubbery state within 16 hours. It forms an effective rubbery gasketing material when thus cured. The composition may be made adherent to masonry, glass, metal, etc., by the addition of small amounts, of the order of one percent, of adhesive resins such as "ERL-2795" or "ERL-2774" liquid epoxy resins.

What is claimed is as follows:

1. A spreadable viscous fluid coating composition maintained in stably fluid condition in a sealed container and comprising a liquid polymercaptan polymer having a molecular weight between about 300 and about 8000, an oxidative curing agent, and barium hydroxide; said curing agent in admixture with said liquid polymer causing not more than slight thickening thereof in 3 days at 120°F.; said barium hydroxide being present as an impalpable powder dispersed throughout said composition, and in amount of about 2 to about 30 parts per 100 parts by weight of said polymer; and said composition being characterized as being capable of atmospheric curing to a non-tacky surface in 4 hours and in eighth-inch section to a rubbery state within 4 days at 77°F. and 50% relative humidity.

2. A spreadable viscous adherent sag-resistant thixotropic fluid coating composition maintained in stably fluid condition in a sealed container and comprising 100 parts by weight of a liquid polymercaptan polysulfide polymer having a molecular weight between about 300 and about 8,000, from 4 to about 30 parts of a divalent metal peroxide oxidative curing agent, and from about 2 to about 30 parts of barium hydroxide; said curing agent being characterized as causing not more than slight thickening of a mixture of 100 parts by weight of said polymer, one part of isosebacic acid, and 10 parts of said curing agent, on heating said mixture for 3 days at 120°F.; said barium hydroxide being present as an impalpable powder; said composition being stable on storage and adapted for atmospheric curing.

3. The product of claim 2 in which the curing agent is zinc peroxide.

4. The product of claim 2 in which the curing agent is calcium peroxide.

5. The product of claim 2 in which the curing agent is strontium peroxide.

6. The product of claim 2 in which the curing agent is barium peroxide.

7. A spreadable viscous sag-resistant thixotropic fluid coating composition comprising a liquid polymercaptan polyester polymer, a divalent metal peroxide oxidative curing agent, and barium hydroxide; said curing agent being characterized as causing not more than slight thickening of a mixture of 100 parts by weight of said polymer, one part of isosebacic acid, and 10 parts of said curing agent, on heating said mixture for 3 days at 120°F.; said barium hydroxide being present as an impalpable powder; said composition being confined in a container sealed against the atmosphere and being stable on storage and adapted for atmospheric curing.

8. A collapsible tube sealed against the atmosphere and containing a spreadable viscous fluid coating composition capable of remaining in stably fluid condition under prolonged storage in said tube and adapted for atmospheric curing on being extruded from said tube, said composition comprising, by weight: 100 parts of liquid polymercaptan polysulfide polymer having a molecular weight within the range of about 300 to about 8,000; an amount within the range of about 4 to about 30 parts, and sufficient to serve as an oxidative curing agent for said polymer, of divalent metal peroxide selected from the class of zinc peroxide, calcium peroxide, strontium peroxide, barium peroxide, and mixtures thereof; and barium hydroxide in impalpable powder form and in amount within the range of about 2 to about 30 parts.

9. A stable unitary liquid polymer composition protected from moisture and capable of being shipped and stored in a single container and later being deposited in place without agitation or intermixing with other material for complete curing by contact of its surface with surroundings containing essentially only moisture, said composition comprising essentially (a) a liquid polyalkylene polysulfide polymer having thoroughly dispersed therein, (b) a dormant curing agent in an amount sufficient to cure said polymer which is activated by the presence of moisture, and (c) barium hydroxide present as an impalpable powder adapted and sufficient to maintain said polymer in dry condition during shipment and storage and to attract and adsorb moisture from its surroundings after deposition in place to hasten the curing of said polymer by said curing agent, wherein (b) and (c) are different substances and said accelerating agent is water-soluble.

10. A stable unitary liquid polymer composition protected from moisture and capable of being shipped and stored in a single container and later being deposited in place without agitation or intermixing with other material for complete curing by contact of its surface with surroundings containing essentially only moisture, said composition comprising essentially (a) a liquid polyalkylene polysulfide polymer having thoroughly dispersed therein, (b) a dormant curing agent in an amount sufficient to cure said polymer which is activated by the presence of moisture, and (c) an alkaline desiccating deliquescent accelerating agent adapted and sufficient to maintain said polymer in dry condition during shipment and storage and to attract and absorb moisture from its surroundings after deposition in place to hasten the curing of said polymer by said curing agent, wherein (b) and (c) are different substances and said accelerating agent is water-soluble and composed of at least one number of the group consisting of the alkaline earth metal oxides and hydroxides.

11. A composition as set forth in claim 10 wherein said surroundings are atmospheric air.

12. A composition as set forth in claim 10 wherein said deliquescent agent is barium oxide.

13. A composition as set forth in claim 10 wherein said deliquescent agent is an alkaline earth metal oxide.

14. A composition as set forth in claim 10 wherein said deliquescent agent is an alkaline earth metal hydroxide.

* * * * *

UNITED STATES PATENT OFFICE
CERTIFICATE OF CORRECTION

PATENT NO. : 3,912,696
DATED : October 14, 1975
INVENTOR(S) : JOHN I. DOUGHTY

It is certified that error appears in the above-identified patent and that said Letters Patent are hereby corrected as shown below:

Col. 2, line 12, just after the first full paragraph, insert the following paragraph:

-- Thus, in one embodiment of the invention there is provided a stable unitary liquid polymer composition protected from moisture and capable of being shipped and stored in a single container and later being deposited in place without agitation or intermixing with other material for complete curing by contact of its surface with surroundings containing essentially only moisture, the composition comprising essentially (a) a liquid polyalkylene polysulfide polymer having thoroughly dispersed therein, (b) a dormant curing agent in an amount sufficient to cure said polymer which is activated by the presence of moisture, and (c) an alkaline desiccating deliquescent accelerating agent adapted and sufficient to maintain the polymer in dry condition during shipment and storage and to attract and absorb moisture from its surroundings after deposition in place to hasten the curing of the polymer by the curing agent, wherein (b) and (c) are different substances and said accelerating agent is water soluble and composed of at least one number of the group consisting of the alkaline earth metal oxides and hydroxides. --

Claim 2, Col. 6, line 64, after the wording "300 and about 8,000, from", insert the word -- about -- .

Signed and Sealed this twenty-seventh Day of April 1976

[SEAL]

Attest:

RUTH C. MASON
Attesting Officer

C. MARSHALL DANN
Commissioner of Patents and Trademarks